Sept. 8, 1953
O. R. MISCH
2,651,060
METHOD OF MAKING LOCK NUTS
Filed Jan. 7, 1949
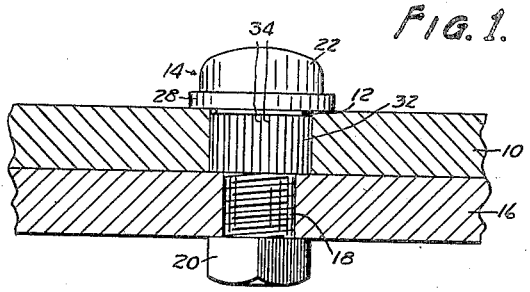
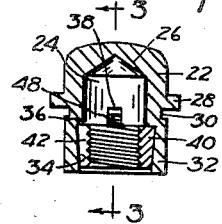
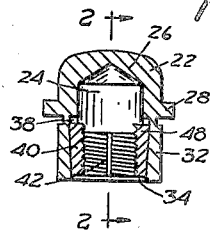
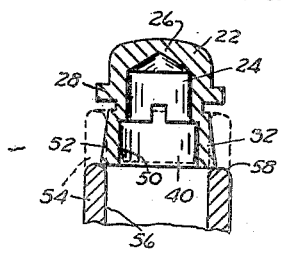
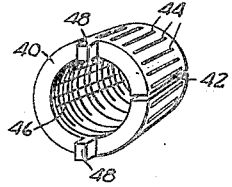
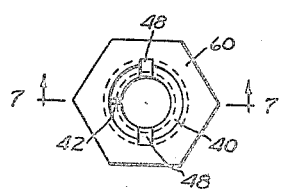
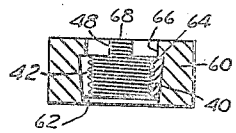
INVENTOR.
Otto R. Misch.
BY
ATTORNEYS.

Patented Sept. 8, 1953

2,651,060

UNITED STATES PATENT OFFICE 2,651,060

METHOD OF MAKING LOCK NUTS

Otto R. Misch, South Bend, Ind.

Original application October 13, 1947, Serial No. 779,527. Divided and this application January 7, 1949, Serial No. 69,741

1 Claim. (Cl. 10—86)

This invention relates to improvements in methods of making lock nuts, and is a division of my co-pending application, Ser. No. 779,527, filed October 13, 1947.

The primary object of the invention is to provide a novel, simple and inexpensive method of making a lock nut.

A further object is to provide a novel method of making a two-piece lock nut of the domed or closed end type.

A further object is to provide a method for producing a lock nut entailing the steps of assembling two parts in operative relation to each other and then re-shaping the outer part uniformly and circumferentially for a substantial portion of its length to provide a socket conforming in contour to the exterior contour of the inner part.

Other objects will be apparent from the following specification.

In the drawing:

Fig. 1 is a view of a dome type lock nut utilized with a cooperating bolt to secure two work pieces together.

Fig. 2 is a longitudinal sectional view of a dome shaped lock nut taken on line 2—2 of Fig. 3.

Fig. 3 is a longitudinal sectional view taken on line 3—3 of Fig. 2.

Fig. 4 is a view illustrating one step in the method of producing the lock nut.

Fig. 5 is a perspective view of the inner part of the lock nut.

Fig. 6 is an end view of a modified embodiment of the invention applied to a lock nut open at both ends.

Fig. 7 is a transverse sectional view taken on line 7—7 of Fig. 6.

Referring to the drawing which illustrates the preferred embodiments of the invention, and particularly to Figs. 1 to 5, inclusive, which illustrate the embodiment of the invention in a lock nut of the dome type, the numeral 10 designates one work piece having a bore 12 therein adapted to receive and mount the shank of a dome-shaped lock nut 14. A second work piece 16 to be secured to the work piece 10 is illustrated as having a bore therein axially aligned with the bore 12 for receiving the screw-threaded shank 18 of a bolt whose head 20 is adapted to bear against the surface of work piece 16 around the bore in said work piece. It will be understood that the bolt 18, 20 may be of any conventional form and preferably, and as here shown, a conventional machine screw.

The dome type nut is of the construction best illustrated in Figs. 2 and 3 and comprises a body portion 22 having an axial bore 24 open at one end of the nut and terminating in spaced relation to the other end of the nut to provide an imperforate outer end portion 26 aligned therewith. An enlarged circumferential shoulder 28 is formed integrally with the body 22 intermediate its ends and is adapted to bear against the outer surface of the work piece on which it is to be mounted, that is, against the uppermost surface of the work piece 10 illustrated in Fig. 1. The body is preferably provided with a circumferentially reduced diameter neck portion 30 adjacent the circumferential flange 28, and the shank 32 of the nut between said reduced neck 30 and the open end of the nut is preferably of cylindrical exterior contour and is also preferably longitudinally knurled at 34.

The bore 24 in the body 22 is preferably of cylindrical contour at its inner end and its outer end portion defines a tapered or conical surface 34 whose open end is preferably of a diameter substantially the same as the diameter of the inner bore portion 24 and whose large diameter end portion is positioned innermost to define a circumferential transverse outwardly facing shoulder 36. The length of the tapered portion of the bore is preferably shorter than the length of the shank portion 32 of the body 22, as illustrated. One or more longitudinal slots 38 are formed in the inner reduced portion of the bore 24 and interrupt the shoulder 36, being of a depth substantially equal to the width of said shoulder. As here illustrated, two such slots 38 are formed in diametrically opposed relation, but it will be understood that only one slot 38 or more than two slots 38 may be provided if desired.

The inner part of the nut is preferably of the form and construction best illustrated in Fig. 5 and comprises a metal sleeve 40 which is split at 42 for its full length and whose length is preferably less than the length of the tapered portion 34 of the bore of the body 22. The outer surface of the sleeve 40 is of conical form or configuration with the angle of taper thereof longitudinally being substantially the same as the angle of taper of the tapered or conical bore portion 34 of the body part 22. If desired, the exterior surface of the sleeve 40 may be longitudinally knurled at 44 as shown. The sleeve has an internally screw-threaded bore 46 extending therethrough, whose normal inner dimension is less than the small dimension end of the bore 34 and the inner end portion 24 of the bore of the body, as best seen in Figs. 2 and 3. This sleeve will be of a diameter to have a normal threaded fit upon the shank 18 of a machine screw or other threaded bolt to be used therewith. The normal outer diameter of the small diameter end of the sleeve 40 will preferably be slightly greater than the diameter of the bore 34 at its small end, and the outer diameter of said sleeve at its large dimension end will preferably be slightly smaller than the largest diameter at the inner end of the tapered bore 34. In other words, the sleeve 40 will preferably be constructed to have a certain freedom of movement and a certain looseness of fit within the tapered portion 34 of the outer end of body part 22. One or more lugs 48, equal in number to the number of slots 38 formed in the body 22 and similarly located, project longitudinally from the large dimension end of the sleeve 40 and are of such size and shape that they fit freely and slidably in said slots 38. These lugs will be of a length exceeding the difference in the lengths of the sleeve 40 and its receiving bore 34. As here illustrated, the lugs 48 form continuations of the outer periphery of the sleeve 40 but their outer longitudinal surfaces are parallel to the axis of the sleeve rather than continuations of the conical outer surface of the sleeve.

It will be observed that the formation of the nut with its small diameter parts outermost and its large diameter parts located centrally thereof eliminates the necessity for swaging of parts to hold or retain the inner part within its rigid outer sheath. In order to accomplish the assembly of the parts in this relation I have perfected a novel process which is best illustrated in Fig. 4. According to this process the shank portion 32 of the body 22 of the nut is initially formed with a cylindrical bore 50 of the same diameter as the outer diameter of the shoulder 36. The outer surface 52 of the shank 32 is of tapered or conical form with its large diameter end positioned outermost. In all other respects, including the formation of the slots 38, the construction of the body 22 is substantially the same as in its finished form. It will be apparent, therefore, that the sleeve 40 may be freely inserted into the body 22 by virtue of the cylindrical form of the bore 50. Thus, after the body 22 shaped as illustrated in Fig. 4 has been formed, and the sleeve 40 has been inserted therein as illustrated in dotted lines in said figure, the essential step of the process is to reshape the shank portion 32 to the form illustrated in Figs. 2 and 3. I have found that this can be accomplished by the use of a cylindrical die 54 whose inner periphery 56 is of the same diameter as the desired external diameter of the shank 32. This die has a rounded leading edge 58 of such contour that when a body in the form illustrated in Fig. 4 is engaged by said rounded edge 58 in centered relation, the outer peripheral edge of said body will engage an inwardly tapered or curved portion of the edge 58. Pressure is thereupon exerted longitudinally or axially of the parts to urge one thereof in the direction of the other so that the shank 32, which will be of less thickness than the walls of the die 54 and of weaker construction, will yield incident to the pressure and be reshaped by the die 54. It will be apparent that when the parts have been pressed with sufficient force, the shank 32 will enter the cylindrical bore 56 of the die 54 to position the parts as illustrated in dotted lines in Fig. 4, thus reshaping the outer tapered surface 52 of the shank to the desired cylindrical shape. Inasmuch as the thickness of the walls of the shank between the shoulder 36 and the outer edge of the body 22 increases progressively outwardly, a cold flow of the metal of the shank will result from the inward construction of the outer surface of said shank, and the tapered inner bore 34 will result. In other words, the shank 32 of the body 22 is subjected to what is commonly known in the art as a cold punch drawing operation to reduce its circumferential size, and a uniform circumferential action upon the shank will result in the production of the body shank 32 of the shape shown in Figs. 2 and 3. Inasmuch as the circumference of the shank 32 is reduced in this operation, the taper of the bore 34, which is produced by the operation, will be different from the taper of the outer surface 52. Thus, for example, if the taper of the conical surface 52 in the Fig. 4 form of the body 22 is six degrees with respect to the axis of the body 22, then after the punch drawing operation the taper of the inner surface 34 of said shank will be in excess of six degrees relative to the axis of the bore and in the opposite direction. When the punch drawing operation has been completed, the inner part is positively retained in the bore portion 34 of the body 22 and cannot be removed therefrom. The punch drawing operation has the advantage that the contraction or reduction of the diameter of the shank 32 is uniform so that the sleeve 40 will be loose therein and capable of shifting longitudinally therein.

It will be apparent that the lock nut can be produced quickly and economically without complicated machining for the production of the interiorly tapered portion 34. After the punch drawing operation, the exterior surface of the shank may be machined to exact dimension desired and may be externally knurled at 34, and further machined to insure the exact transverse planar character of the work-engaging face of the shoulder 28. These operations are not essential, however, in cases where close tolerances of external dimensions of the shank are not required.

In the use of the device, the dome-shaped nut has a tight or snug fit with the aperture 12 of the work piece 10 and is pressed therein in any suitable manner, and the inner surface of its shoulder 28 bears against the outer surface of the work piece 10. The spacing between the surface of the shoulder 28 and the end surface of the shank 32 will preferably be less than the thickness of the work piece 10. When the work piece 16 to be joined to the work piece 10 is positioned with its bolt-receiving aperture aligned with the nut, the machine screw or bolt may be inserted and threaded into the bore 46 of the sleeve 40. When the head of the bolt strikes the outer surface of the work piece 16, assuming that the inner surface of said work piece 16 bears against the work piece 10, any further rotation of the bolt will serve to pull outwardly upon the sleeve 40 and to draw said sleeve toward the small dimension end of the tapered bore 34 of the nut. This action serves to contract the sleeve 40 to effect a tight grip upon the threaded shank 18 of the bolt. Thus the bolt can be drawn up until further rotation thereof is impossible, at which time the sleeve will be contracted for a firm positive grip upon the threads of the bolt to provide a connection which will resist the loosening effect of vibration of the parts. It will be apparent that during this tightening rotation of the bolt shank, the lug or lugs 48 slidable within the slots 38 of the body 22 will positively resist and prevent rotation of the sleeve relative to the body 22. This action may be further assisted by the longitudinal knurling 44 which is of value to distribute the rotation resistance throughout the full length of said sleeve to prevent twisting of the sleeve which might disalign the parts of the sleeve on opposite sides of the slots 42.

While the invention has been illustrated in Figs. 1 and 4 as applied to a dome-shaped nut, its application is not limited thereto. The manner in which the invention can be applied to a lock nut open at both ends is illustrated in Figs. 6 and 7. In such a construction the body 60 has the tapered bore portion 62 extending for the major portion of its length and terminating at an intermediate portion of the body to form the shoulder 64. The bore through the body 60 is completed by the reduced diameter cylindrical bore portion 66 whose diameter is preferably substantially equal to the diameter of the small diameter end of the bore 62. One or more slots 68 are formed at the reduced diameter portion 66 and extend the full length thereof. The sleeve 40 used in this type of nut is of the same construction described above and illustrated in Fig. 5 with its lug or lugs 48 fitting in the slots 68 and the length of its body portion slightly less than the tapered bore portion 62. As in the previously described construction, the interior threaded bore 46 is of a smaller diameter than the diameter of bore portion 66 of the body 60 so that the bolt may pass freely through the nut without interference or engagement with the body 60. Both forms of the nut may have the inner longitudinal surfaces of the lugs 48 thereof grooved or threaded to form continuations of the threads of the bore 46 in the event that the thickness of the lugs correspond to the thickness of the large diameter end of the sleeve 40. It will be understood, however, that the thickness of these lugs may be reduced so that the inner faces are outwardly offset relative to the sleeve bore 46 so that they will be clear of the threads of the shank 18 of the bolt used with the nut.

The body 60 of the nut may be provided with the tapered bore shown by a punch drawing operation, as described above, or may be machined to the shape described and illustrated. For this purpose I prefer the punch drawing operation as more economical. It will be understood that this operation can be utilized in a nut of non-circular cross-sectional shape by utilizing a die tube similar to the tube 54 but of the desired cross-sectional shape.

The outer part of the nut, i. e. the body 22 in Fig. 1 or body 60 in Figs. 6 and 7, may be made of any metal which can be cold drawn successfully. Examples of such metals are machine screw steel stock, stainless steel, aluminum and brass.

While the preferred embodiments of the invention have been illustrated and described herein, it will be understood that changes may be made in the construction within the scope of the appended claim without departing from the spirit of the invention.

I claim:

The method of making a lock nut, comprising the steps of forming a tapered unitary contractible split sleeve having a uniform screw-threaded bore extending therethrough, forming an outer part in cup shape with a tubular portion having a smooth substantially cylindrical inner bore substantially equal in diameter to the large external diameter portion of the inner part and greater in diameter than the bore of said split sleeve and with a peripheral outer surface tapering inwardly from its open end, assembling said inner member within said outer member, and then pressing the tubular portion of said outer member in a longitudinal coaxial direction against the flaring end portion of a tubular die having an inner diameter intermediate the diameters of the opposite ends of said initially tapered external surface of said outer part to force the tubular portion of said outer part into said die and uniformly reduce the circumferential size of said tubular portion, whereby the inner surface of said tubular portion is smoothly tapered and is similar to the taper of said inner part with its inner diameter at its open end smaller than the largest outer diameter of said inner part.

OTTO R. MISCH.

References Cited in the file of this patent

UNITED STATES PATENTS

| Number | Name | Date |
|---|---|---|
| 996,133 | Peters | June 27, 1911 |
| 1,904,263 | Berge | Apr. 18, 1933 |
| 2,021,051 | Desbrueres | Nov. 12, 1935 |
| 2,031,824 | Eastman | Feb. 25, 1936 |
| 2,266,961 | Desbrueres | Dec. 23, 1941 |
| 2,388,467 | Cole | Nov. 6, 1945 |
| 2,407,314 | Mason | Sept. 10, 1946 |

FOREIGN PATENTS

| Number | Country | Date |
|---|---|---|
| 124,396 | Switzerland | Feb. 1, 1928 |
| 305,278 | Great Britain | Feb. 14, 1929 |